US012230255B2

(12) United States Patent
Machanavajhala et al.

(10) Patent No.: US 12,230,255 B2
(45) Date of Patent: Feb. 18, 2025

(54) INTELLIGENT DISPLAY OF AUDITORY WORLD EXPERIENCES

(71) Applicant: MICROSOFT TECHNOLOGY LICENSING, LLC, Redmond, WA (US)

(72) Inventors: Venkata Naga Vijaya Swetha Machanavajhala, Redmond, WA (US); Ryan Graham Williams, Duvall, WA (US); Sanghee Oh, Los Angeles, CA (US); Ikuyo Tsunoda, Seattle, WA (US); William D. Lewis, Seattle, WA (US); Jian Wu, Bellevue, WA (US); Daniel Charles Tompkins, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 17/726,465

(22) Filed: Apr. 21, 2022

(65) Prior Publication Data

US 2023/0343330 A1  Oct. 26, 2023

(51) Int. Cl.
| | |
|---|---|
| *G10L 15/18* | (2013.01) |
| *G06F 3/14* | (2006.01) |
| *G06F 3/16* | (2006.01) |
| *G10L 15/22* | (2006.01) |
| *G10L 25/51* | (2013.01) |

(Continued)

(52) U.S. Cl.
CPC ............ *G10L 15/1815* (2013.01); *G06F 3/14* (2013.01); *G06F 3/167* (2013.01); *G10L 15/22* (2013.01); *G10L 25/51* (2013.01); *G10L 25/78* (2013.01); *G10L 2015/088* (2013.01)

(58) Field of Classification Search
CPC ..... G10L 15/1815; G10L 15/22; G10L 25/51; G10L 25/78; G10L 2015/088; G06F 3/14; G06F 3/167
See application file for complete search history.

(56) References Cited

U.S. PATENT DOCUMENTS

| | | | | |
|---|---|---|---|---|
| 8,537,983 B1 * | 9/2013 | Haggerty | ................ | G06F 3/167 |
| | | | | 379/265.06 |
| 10,878,819 B1 * | 12/2020 | Chavez | ................... | G10L 15/25 |
| 11,854,575 B1 * | 12/2023 | Pinkus | .................... | G10L 25/63 |

(Continued)

*Primary Examiner* — Brian L Albertalli

(74) *Attorney, Agent, or Firm* — Scott Y. Shigeta; Newport IP, LLC

(57) ABSTRACT

The techniques disclosed herein provide intelligent display of auditory world experiences. Specialized AI models are configured to display integrated visualizations for different aspects of the auditory signals that may be communicated during an event, such as a meeting, chat session, etc. For instance, a system can use a sentiment recognition model to identify specific characteristics of a speech input, such as volume or tone, provided by a participant. The system can also use a speech recognition model to identify keywords that can be used to distinguish portions of a transcript that are displayed. The system can also utilize an audio recognition model that is configured to analyze non-speech audio sounds for the purposes of identifying non-speech events. The system can then integrate the user interface attributes, distinguished portions of the transcript, and visual indicators describing the non-speech events.

20 Claims, 12 Drawing Sheets

(51) Int. Cl.
    *G10L 25/78*    (2013.01)
    *G10L 15/08*    (2006.01)

(56) References Cited

U.S. PATENT DOCUMENTS

| | | | |
|---|---|---|---|
| 2016/0277577 A1* | 9/2016 | Yentis | G06F 40/169 |
| 2018/0122368 A1* | 5/2018 | Costello | G10L 21/0316 |
| 2019/0043500 A1* | 2/2019 | Malik | H04N 21/2187 |
| 2019/0385636 A1* | 12/2019 | Li | G10L 15/02 |
| 2020/0126584 A1* | 4/2020 | Huang | G10L 15/02 |
| 2021/0090592 A1* | 3/2021 | Lee | G10L 15/26 |
| 2021/0407511 A1* | 12/2021 | Wyss | H04M 3/51 |
| 2022/0068296 A1* | 3/2022 | Wilson | G06T 13/205 |
| 2022/0108698 A1* | 4/2022 | Moritz | G10L 25/78 |
| 2022/0318292 A1* | 10/2022 | Kikin-Gil | G06F 16/4393 |
| 2022/0392485 A1* | 12/2022 | Brownlee | G10L 25/30 |
| 2023/0164296 A1* | 5/2023 | Chang | G06F 3/0488 |
| | | | 348/14.09 |
| 2023/0317069 A1* | 10/2023 | Nakano | G10L 15/19 |
| | | | 704/251 |
| 2023/0342108 A1* | 10/2023 | Kanevsky | G10L 25/00 |
| 2024/0071407 A1* | 2/2024 | Sundar | G10L 15/22 |

\* cited by examiner

INTELLIGENT DISPLAY OF AUDITORY WORLD EXPERIENCES

BACKGROUND

Nearly half a billion people are deaf or hard of hearing. They are excluded from the hearing world because they cannot distinguish or identify sounds in their environment. The result is that they can miss out on experiencing the world in the same way that hearing people do, or even be prone to facing life-threatening situations.

When it comes to communication programs, such as Zoom, Teams, Google Hangouts, or Facebook Messenger Rooms, some systems may not provide a complete user experience for people with even a small degree of hearing loss. For instance, some programs can process audio streams generated by computers of individual meeting participants to generate a full text transcript of a meeting. Although the text can be displayed in real time, such technologies do not convey the full context of the audio component of a meeting. Existing speech to text technologies may not effectively convey all types of social cues that are included in audio data of a collaborative session.

These shortcomings can lead to ineffective interactions between a computing device and a user. In addition, the above-described shortcomings of existing systems can lead to a loss in user engagement. Computing devices that do not promote user engagement, or worse, contribute to a loss of user engagement, can lead to production loss and inefficiencies with respect to a number computing resources. For instance, when a user becomes fatigued or disengaged, that user may need to refer to other resources, such as documents or use other forms of communication, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience of communication systems more engaging and more like an in-person meeting.

SUMMARY

The techniques disclosed herein provide intelligent display of auditory world experiences. The disclosed embodiments can utilize a hearing artificial intelligence (AI) application that generates a number of integrated sound visualizations to provide context to audio signals of a communication session. Specialized AI models are used to generate and display integrated visualizations for different aspects of the audio signals that may be communicated during an event, such as a meeting, chat session, etc. For instance, a system can use a sentiment recognition model to identify specific characteristics of a speech input, such as a speaker's volume or tone. The speech characteristics can be used to determine a sentiment, which is used to select user interface (UI) arrangement attributes, e.g., colors, layout features, etc. The system can also use a speech recognition model to identify keywords that can be used to distinguish portions of a transcript that are displayed. The system can also utilize an audio recognition model that is configured to analyze non-speech audio sounds for the purposes of identifying non-speech events. This model can be used to provide context for certain non-speech activity such as background noise, alarms, etc. The system can then integrate the user interface attributes, distinguished portions of the transcript, and visual indicators describing the non-speech events to generate an intelligent display of auditory world experiences.

This integration of the sound visualizations provided by all three models can provide a number of technical benefits for computing systems. For instance, by providing visualizations that provide an accurate context using effective combinations of arrangement attributes, text highlights, and visual indicators for nonspeech activity, the system can greatly promote user engagement. As described above, by promoting user engagement and helping users avert user fatigue, particularly in a communication system, users can more effectively exchange information. This helps mitigate occurrences where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
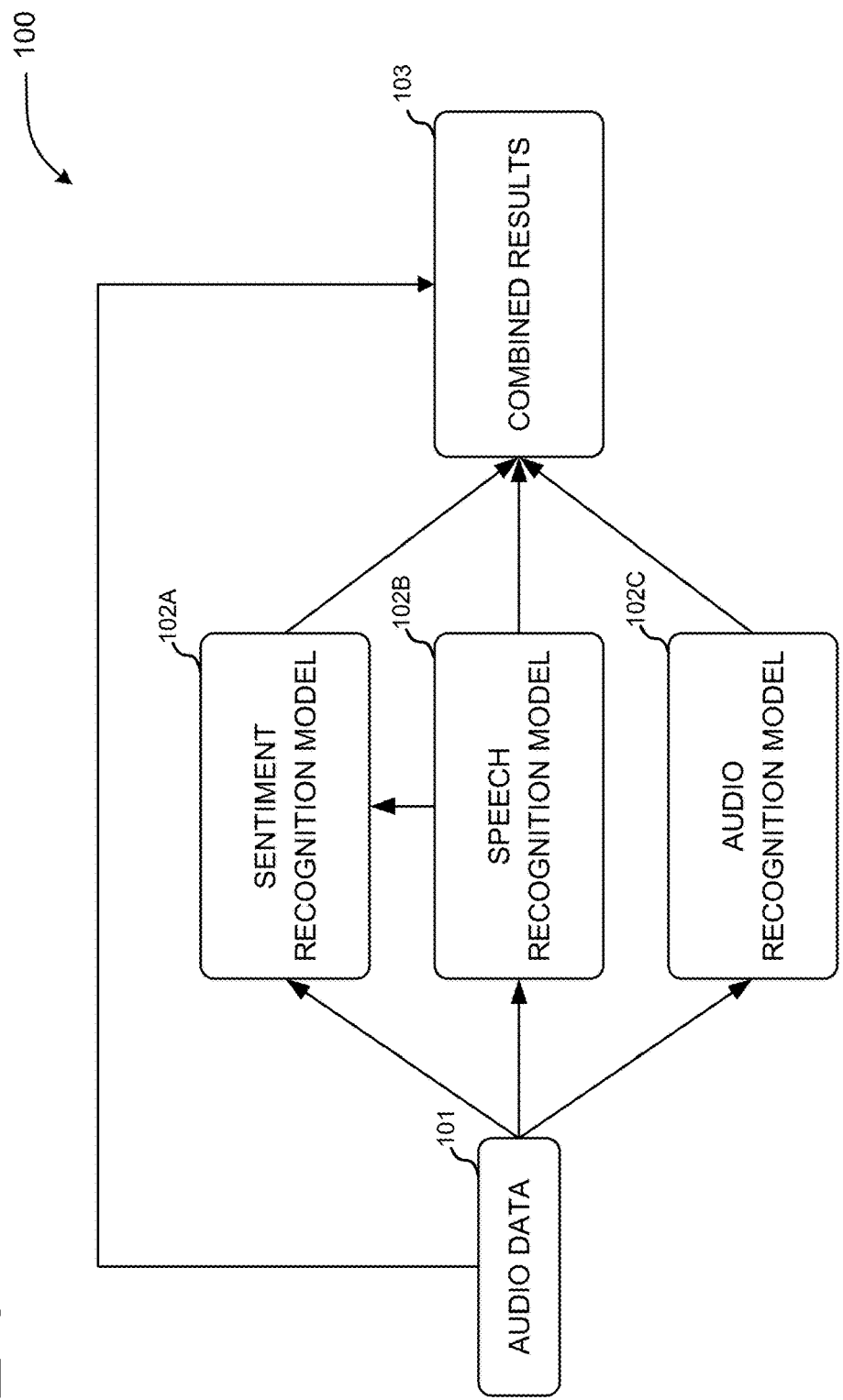
FIG. 1 is a block diagram of a system for including artificial intelligence models for providing intelligent display of auditory world experiences.

FIG. 1 is a block diagram of a system 100 comprising AI models 102 that provide intelligent displays of auditory world experiences. In this example, the system includes a sentiment recognition model 102A, a speech recognition model 102B, and an audio recognition model 102C. The models 102 are configured to process audio data 101 that can include individual audio streams received from a number of computers participating in a communication session. In some configurations, the intelligent displays of auditory world experiences can include a display of a customized user interface for communication sessions for meetings, broadcasts, or any other type of collaborative event that allows users to share audio data.

Each model 102 can be used to analyze the audio data in different ways. For example, the sentiment recognition model 102A is configured to determine a sentiment, e.g., a mood or intensity level, based on one or more characteristics of a speaker's voice. In some embodiments, the sentiment recognition model can analyze a volume of a person who is talking to determine a sentiment of that person's presentation. In other embodiments, vocal inflections, timing variations, rate of speech, a tone, or other characteristics of a speaker's voice can be used to determine a sentiment. The system can generate data indicating a sentiment, which can be associated with a sentiment classification, e.g., intense, calm, normal, angry, happy, etc.

The speech recognition model 102B can be used to generate a transcript from spoken words detected in the audio data received from each user. The speech recognition model 102B is also configured to identify keywords of a speech input of a person. The keywords can be identified using a number of different methods. In some embodiments, the system can analyze a transcript that is generated from the audio data. Words from the transcript can be selected as keywords if those words match words or phrases of a keyword list. The keyword list can also be dynamically customized based on different types of user activity that may be captured during meetings or other events. The keyword list can be modified based on a number of factors to allow the system to adapt and improve its accuracy of identifying keywords.

Also shown in FIG. 1, the speech recognition model 102B can also provide an output to the sentiment recognition model 102A. In some configurations, the output can include a transcript of spoken words that is determined by the speech recognition model. Words of the transcript can be utilized by the sentiment recognition model to determine the sentiment. Thus, in addition to a person's volume, tone or rate of speech, the sentiment recognition model can determine a sentiment based on the person's spoken words. For instance, a person who is speaking with a soft tone, at a low volume, and stating words, such as "please," "thank you," the sentiment recognition model could determine a particular sentiment such as "calm," "friendly," etc.

The audio recognition model 102C can be used to identify non-speech events based on the analysis of a non-speech audio input of at least one audio stream. The audio recognition model 102C can be configured to distinguish a non-speech audio input from a speech input. Portions of the audio data that are identified as a non-speech audio input are associated with an event category or a label. For instance, if a pattern of a non-speech input has characteristics of an alarm, e.g., based on the presence of a certain frequency modulation pattern, the system can label that non-speech input as an "alarm." The system can also identify and label other types of non-speech events such as a crying baby, barking dog, etc. The system can also record other metadata with an identified non-speech event. For instance, the audio recognition model 102C can record timestamps of when an event started and stopped, intensity levels of each non-speech event, and other data that can be used to characterize a non-speech event.

As shown in FIG. 1, the system 100 can combine the output of each model 102 to generate data defining combined results 103. In some configurations, as shown in the examples of FIGS. 2-8, the combined results 103 can be in the form of a user interface 201 having arrangement attributes and other visual indicators that provide auditory world experiences in a visual format. The examples of FIGS. 2-8 illustrate how different types of sounds of the audio data can be detected by each model and how each model can generate an output that modifies different aspects of the user interface 201.

In the following examples, such as the user interface of FIG. 2, an output generated by each model 102 can be used to configure a user interface 201 depicting a transcript 202 of spoken words of users of a communication session. The system can utilize the sentiment recognition model 102A to select arrangement attributes 210 of the user interface based on a determined sentiment. For instance, the system 100 can select a color, a background pattern, and/or text notification for display based on a sentiment that is determined from a volume of a speaker's voice. In one illustrative example, if a person is talking with a volume that is below a threshold or within a predetermined volume range, the sentiment recognition model 102A may determine that the presenter is speaking with a particular sentiment, e.g., that the speaker's voice is normal or neutral. In response to this determined sentiment, the system may select arrangement attributes 210 that cause a display of a selected color and a selected layout, such as a yellow background color. The selected arrangement attributes 210 can also include text descriptions 211 indicating the determined sentiment, e.g., "neutral." The sentiment recognition model 102A can also cause the generation of one or more graphical elements representing the determined sentiment. For instance, a "normal" or "neutral" sentiment can cause the generation of a graphical element 212 that graphically expresses the determined sentiment.

To expand on the above-described example further, using features that are not shown in FIG. 1, if the sentiment recognition model 102A determines that the person is talking with a volume that is above the threshold, the system may determine another sentiment associated with the speaker, such as a sentiment of high intensity. In response to this determined sentiment, the system may select arrangement attributes that cause a display of a red background color with a text notification with the word "intense." The sentiment can be based on any combination of factors such as a person's tone, vocal inflections, speaking rate, etc. For instance, a low tone, with a high volume and a slow rate of speech can indicate a sentiment of high intensity. If one or more of those metrics change to a value below a threshold, the sentiment can change, and the arrangement attributes of the UI can be modified to reflect the new sentiment.

In another example, the sentiment recognition model 102A may analyze a speech input and generate an output indicating that a user's sentiment is neutral. In some configurations, the neutral sentiment may be based on an average volume for a predetermined period of time or a particular section of the speech input. However, if the speech input emphasizes a few words, the sentiment recognition model 102A can also generate an output causing the system to highlight those words. The emphasis can include any type of variation in the user's voice including variations in a speech rate used for particular words, a volume for particular words, a tone for particular words, etc. The highlighting for the words having emphasis in the speech input can include bolding, color changes, font changes, font size changes, etc. The words that are emphasized by the sentiment recognition model 102A may also be highlighted with words that are highlighted by the speech recognition model 102B. In one illustrative example, a speech input having specific words that are emphasized using a slow speech rate and/or a high volume may be highlighted in the user interface.

Figure 2:
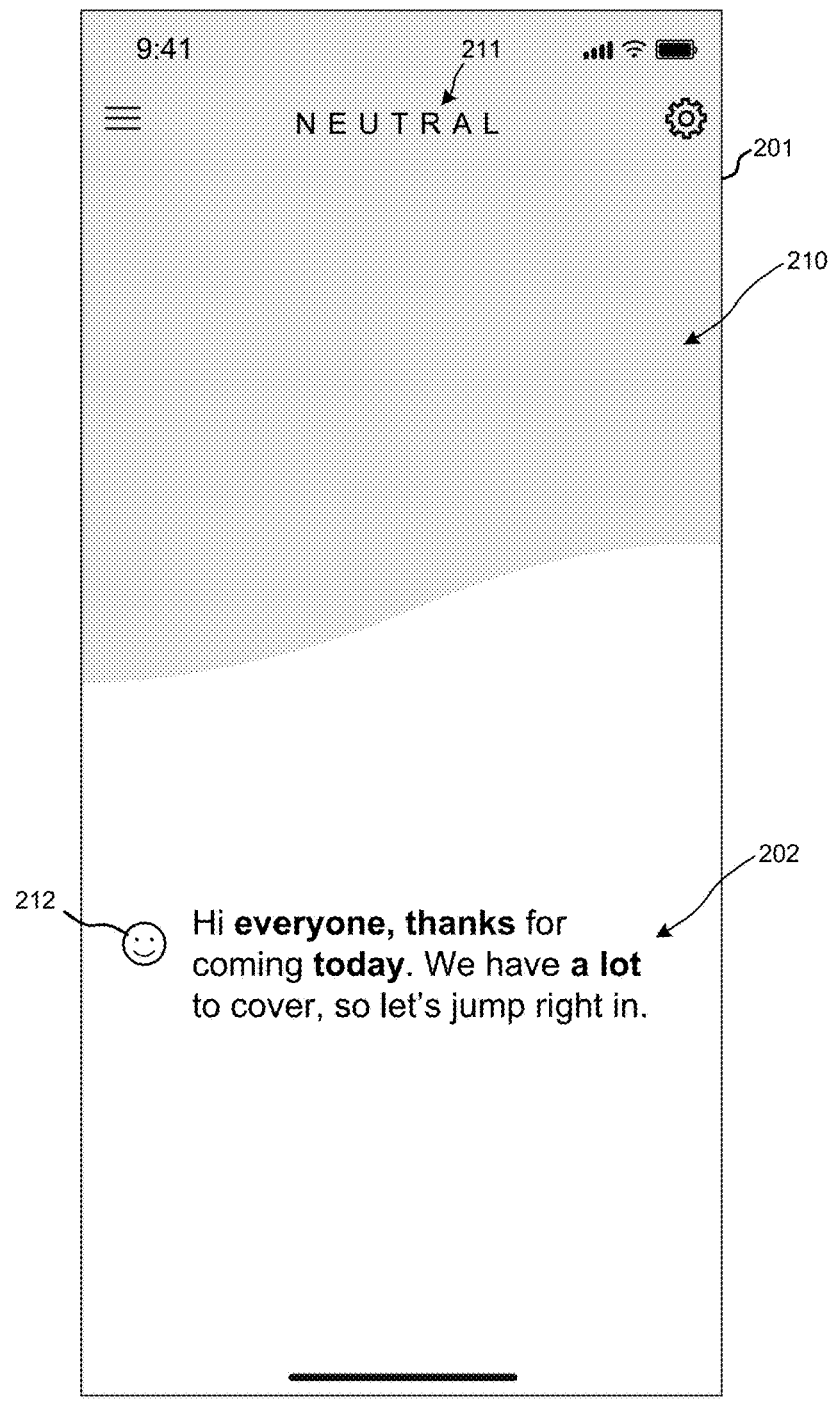
FIG. 2 is an example user interface and a model configuration for a scenario where a person is talking with a happy tone and a normal volume.
Figure 2:
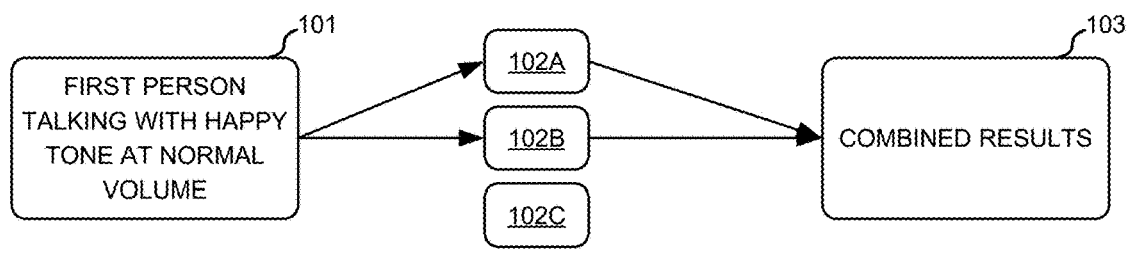

As shown in FIG. 2, the speech recognition model 102B can generate a transcript of spoken words from any speech input of the audio data 101. In addition, the speech recognition model 102B can also identify keywords based on one or more factors. In this example, the speech recognition model 102B identifies "everyone," "thanks," "today," and "a lot" as keywords. As described herein, such words can be identified as keywords response to determining that words of the transcript meet one or more criteria, such as having threshold match with words or phrases of a keyword list. The identified keywords are graphically distinguished, e.g., highlighted in bold text.

Figure 3:
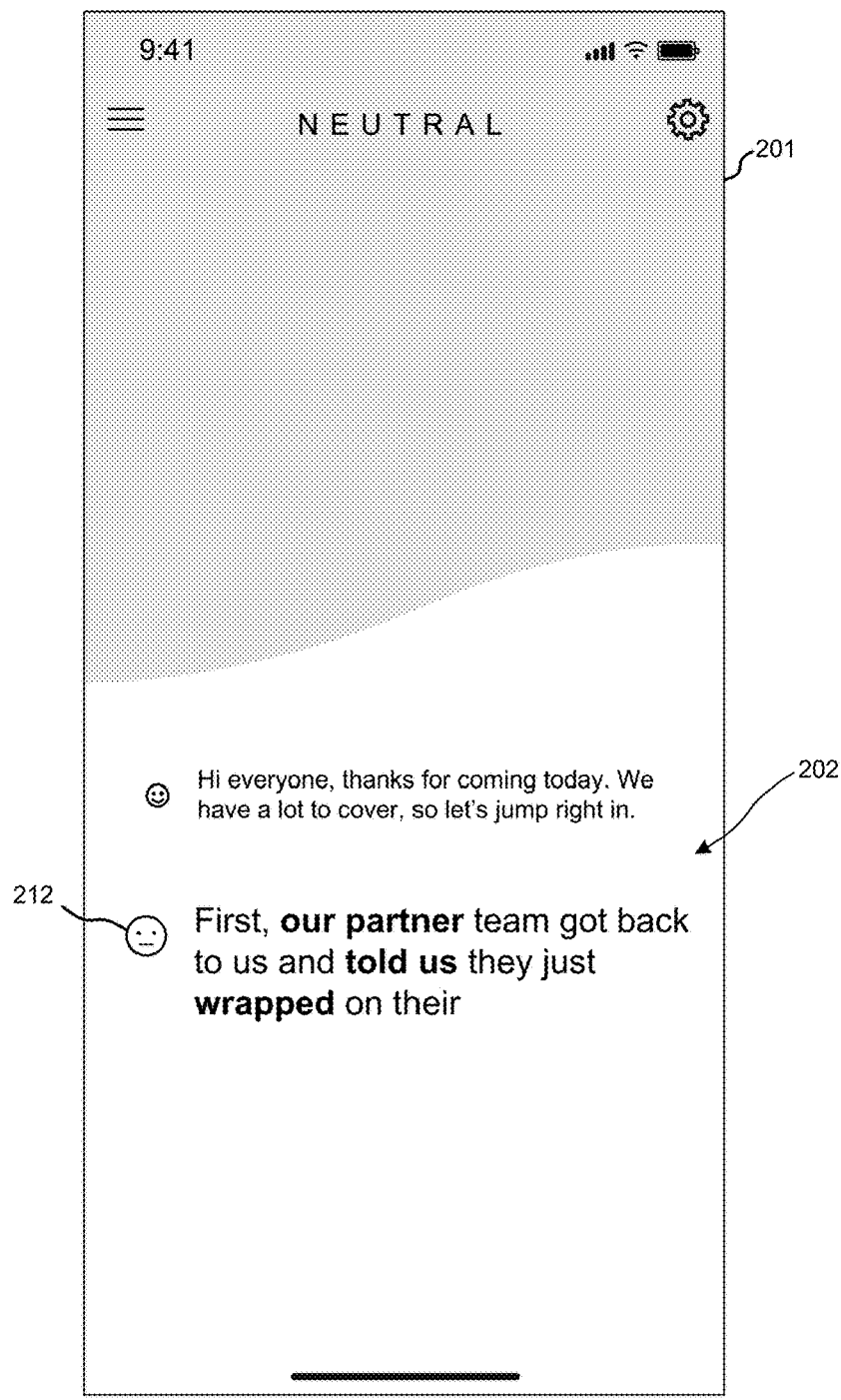
FIG. 3 is an example user interface and a model configuration for a scenario where a person is talking with a different sentiment.
Figure 3:
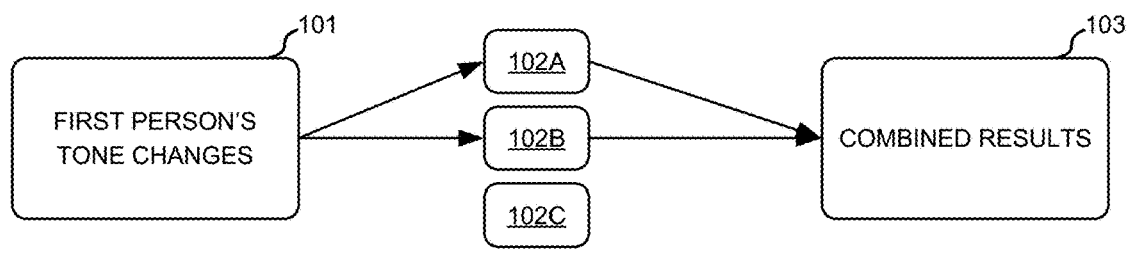

With reference to the example of FIG. 3, consider a scenario where the speech input has changed since the input described above with respect to FIG. 2. In this particular example, the person's tone and/or volume changes. Based on this tone and/or volume change, the sentiment recognition model 102A can determine that the sentiment has changed. This changed sentiment can also be based on keywords that are identified within the user's speech input. In response to this change in the sentiment, the system can update any of the arrangement attributes including, but not limited to, a modification to the graphical element 212. Also shown in FIG. 3, the speech recognition model 102B is used to transcribe the input provided by the speaker. The speech recognition model 102B is also utilized to identify keywords and cause the system 100 to graphically distinguish, e.g., bold or highlight, the identified keywords.

Figure 4:
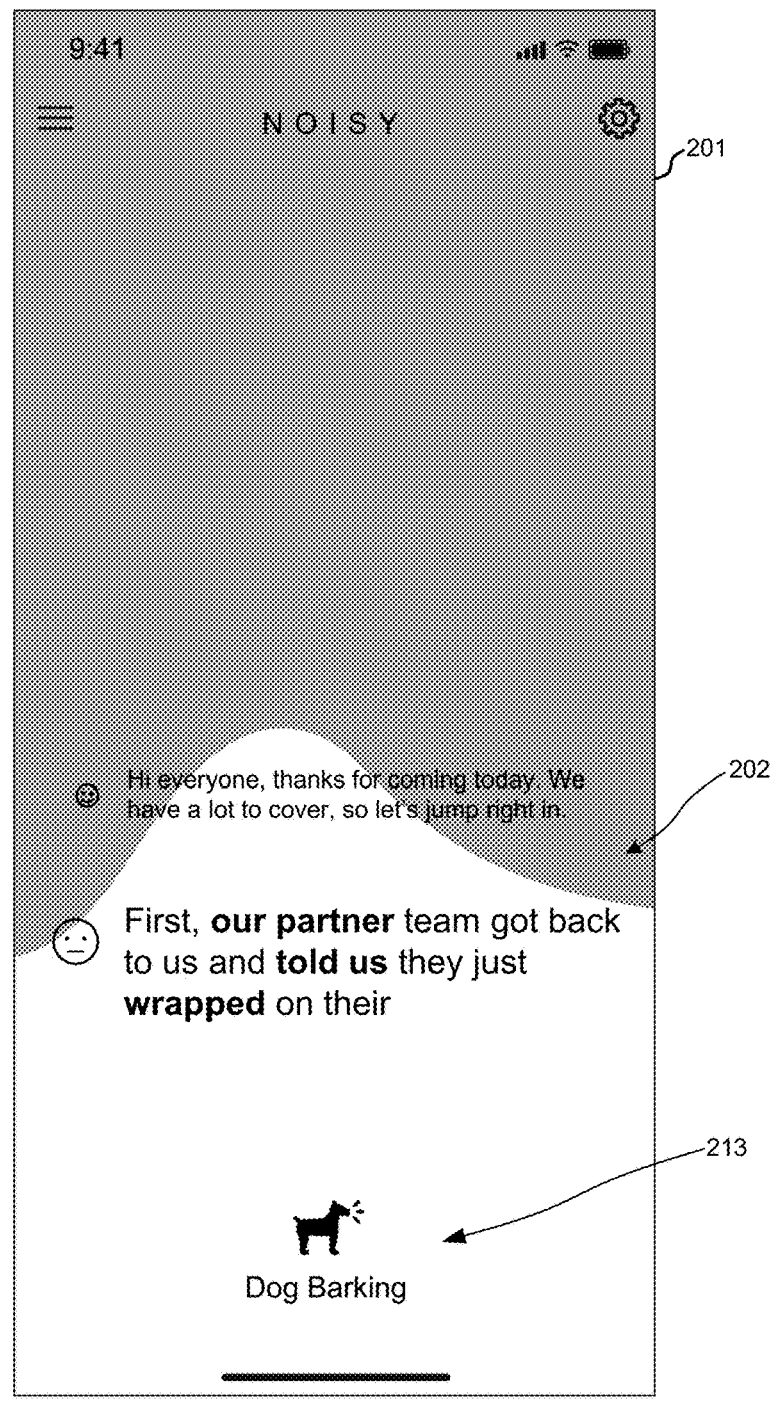
FIG. 4 is an example user interface and a model configuration for a scenario where one stream of a communication system includes background noise, such as a barking dog.
Figure 4:
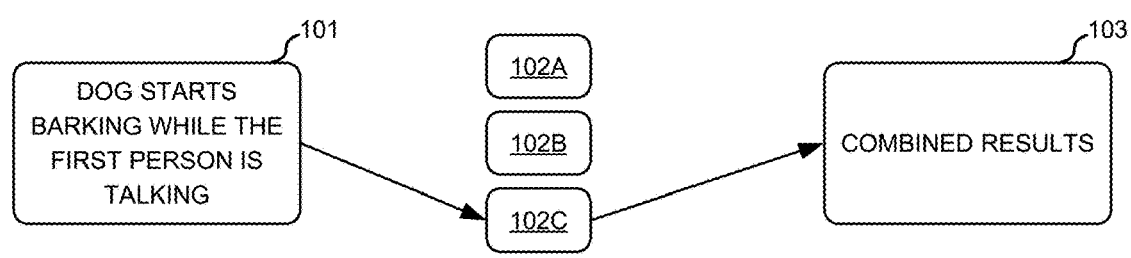

With reference to the example of FIG. 4, consider a scenario where the audio data 101 includes an audio stream generated by a microphone near a barking dog. In such scenarios, the audio recognition model 102C can detect this non-speech event and associate the non-speech event with a predetermined event category. The model may include a database of a number of different event categories such as, barking dogs, crying babies, alarms, airplane noise, etc. The audio data from the microphone can be compared with each predetermined category in the database and a match can be identified utilizing any suitable audio pattern matching technology. In response to detecting the non-speech event and the event category, the audio recognition model 102C can also cause the display of a graphical element 213 configured to convey the event category. The graphical element 213, which is also referred to herein as a "graphical representation 213," can also include text describing the non-speech event.

In some configurations, the audio recognition model can generate an output that defines an audio scene description. In some embodiments, the audio scene description can include a description of audio theme with a rich context that is based on identified sound patterns. For example, the audio recognition model may analyze a non-speech input that has a siren that has an increasing frequency. The model can also detect variations of the siren at particular rates to determine if the audio input includes a siren of the police car versus a siren of a fire engine. With a particular sound pattern, e.g., a sound of a particular siren pattern that has an increase in frequency indicating motion in a particular direction due to the Doppler effect, the audio recognition model may generate rich text data such "a police car driving towards you." If the audio recognition model receives an audio input that has a decreasing frequency, the model may generate an output such as, "a police car is driving away from you." This provides a richer context instead of indicating a particular category or label, such as a siren or a barking dog. This can be achieved by modeling all of audio context during a period of time instead of just one time event.

In some configurations, the system can be customized using sound patterns, sound pattern descriptions, or sound sample files that are provided by users. This way each user can allow the system to monitor the audio data to identify a particular sound pattern. Thus, if the audio data received by the system meets one of our criteria, e.g., has a threshold match, with one of the sound patterns or descriptions provided by the user, the audio recognition model can provide an output that notifies that user when that sound appears during a meeting. The user can also provide preferences that identify users that are to receive these particular types of notifications. For instance, if a user provides a particular sound pattern or a sample audio file and that sound pattern or simple audio file matches the input audio, the system can notify those particular users of that non-speech audio event.

Figure 5:
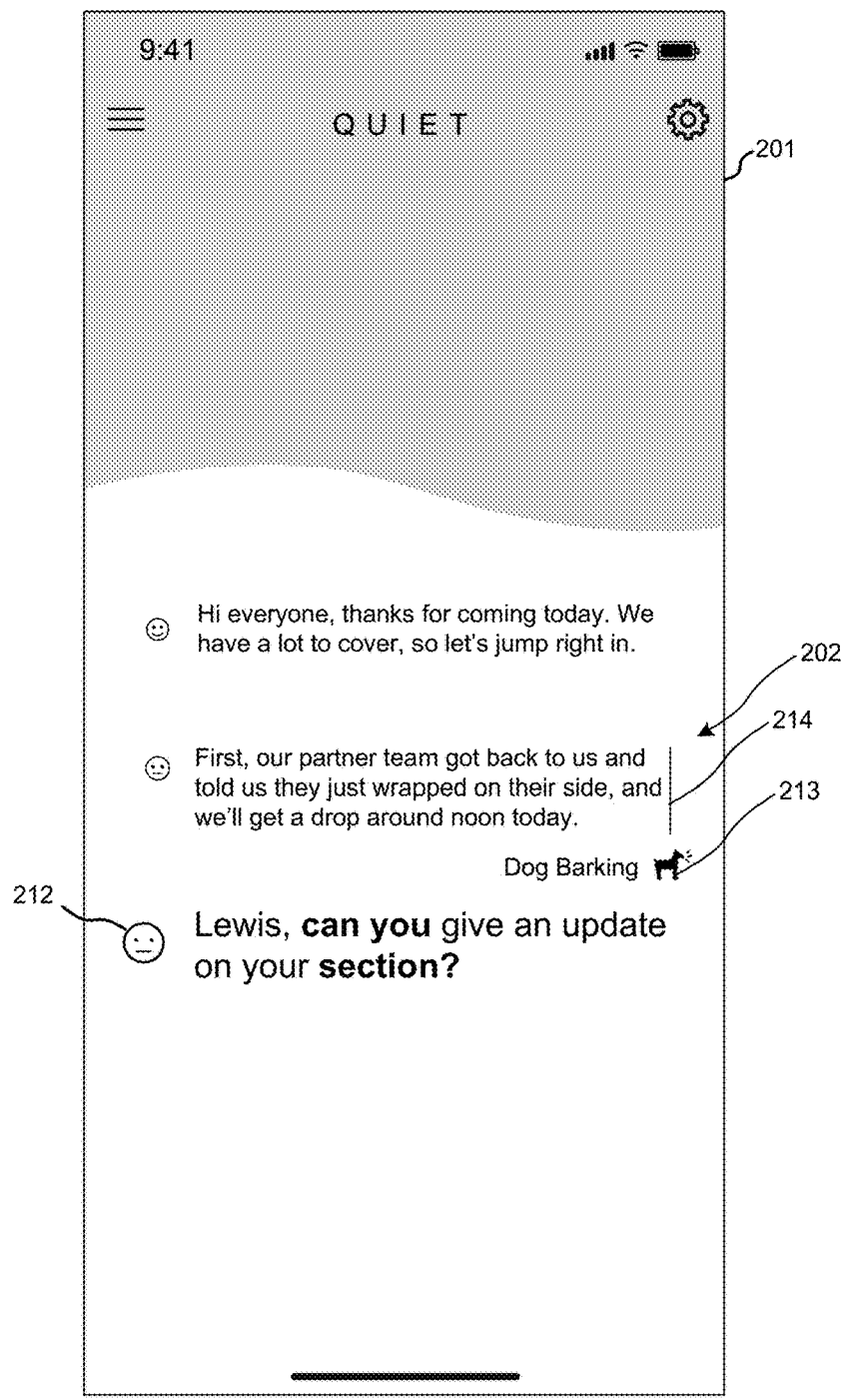
FIG. 5 is an example user interface and a model configuration for a scenario where the dog barking stops.
Figure 5:
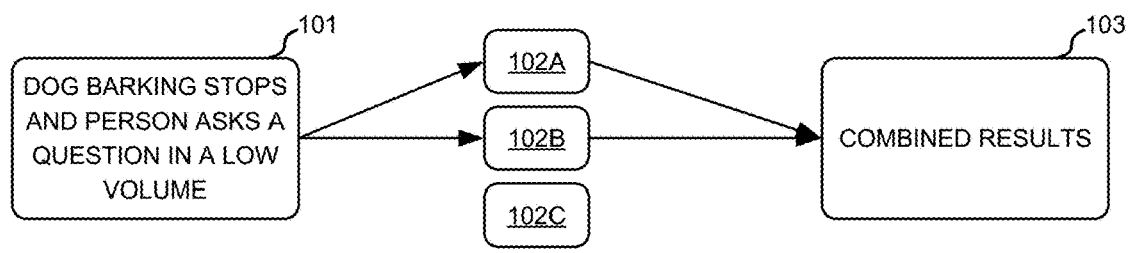

With reference to the example of FIG. 5, when the audio recognition model 102C detects that the non-speech event has stopped, the system can modify the graphical element 213 of the non-speech event such that the element 213 is graphically aligned with an associated portion of the transcript. For instance, the graphical element 213 can be aligned with the sentence of the second speech input since, in this example, the time of the background noise was at the same time as the associated portion of the transcript, the sentence of the second speech input.

Also shown in FIG. 5, a person asks a question with a soft tone of voice, e.g., a low volume. By the use of the sentiment recognition model 102A, the system can generate one or more graphical elements 212 to indicate a determined sentiment. In this case, the given scenario where the user speaks with a low volume, the system can display a graphical element 212 that conveys the determined sentiment. As shown, the system may also respond by modifying one or more arrangement attributes, such as the display of a notification indicating the determined sentiment, e.g., display a "quiet" text message. In addition, the system may respond by modifying other arrangement attributes such as the background color to express the quiet sentiment. The speech recognition model 102B is also utilized in this example to generate the text of the third sentence as well as bringing highlight to identified keywords.

Figure 6:
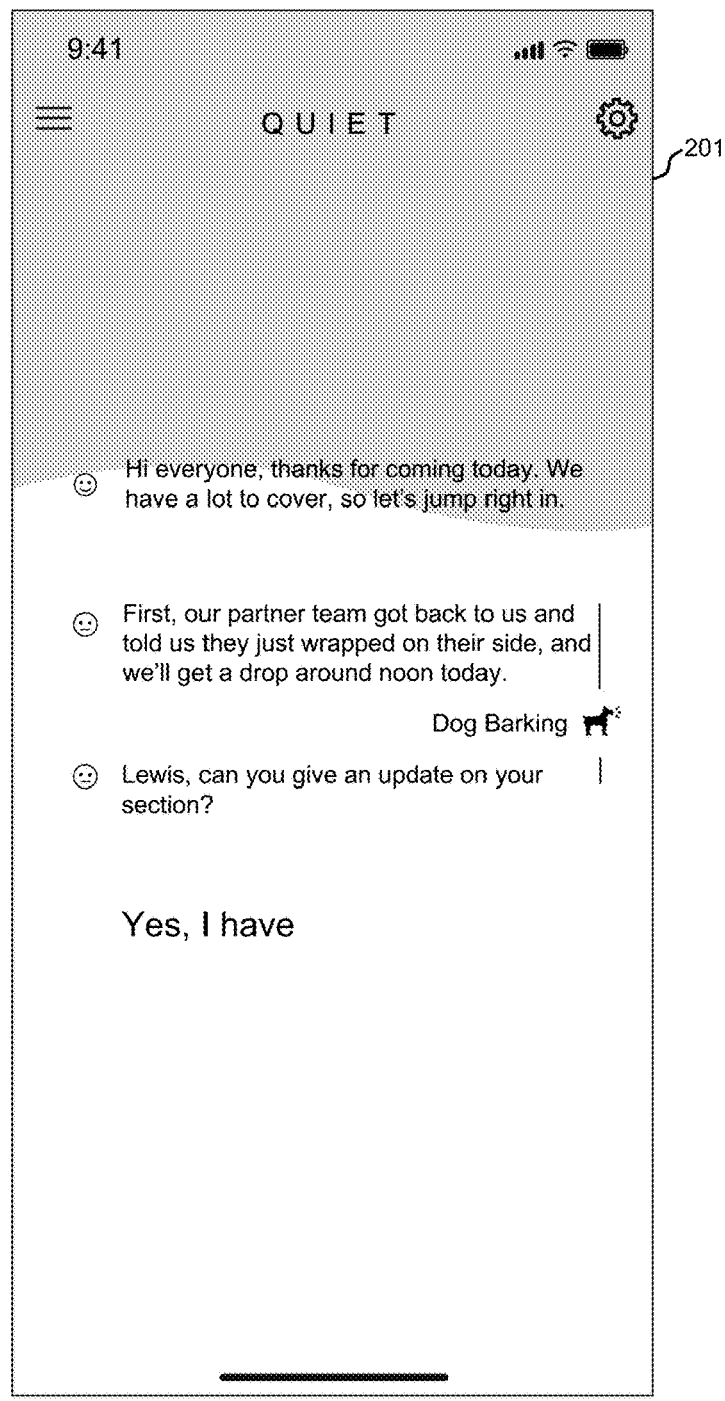
FIG. 6 is an example user interface and a model configuration for a scenario where a second person is talking with a normal volume.
Figure 6:
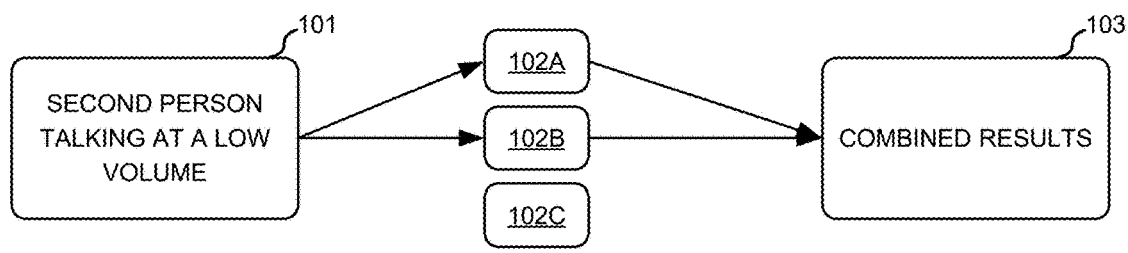
Figure 7:
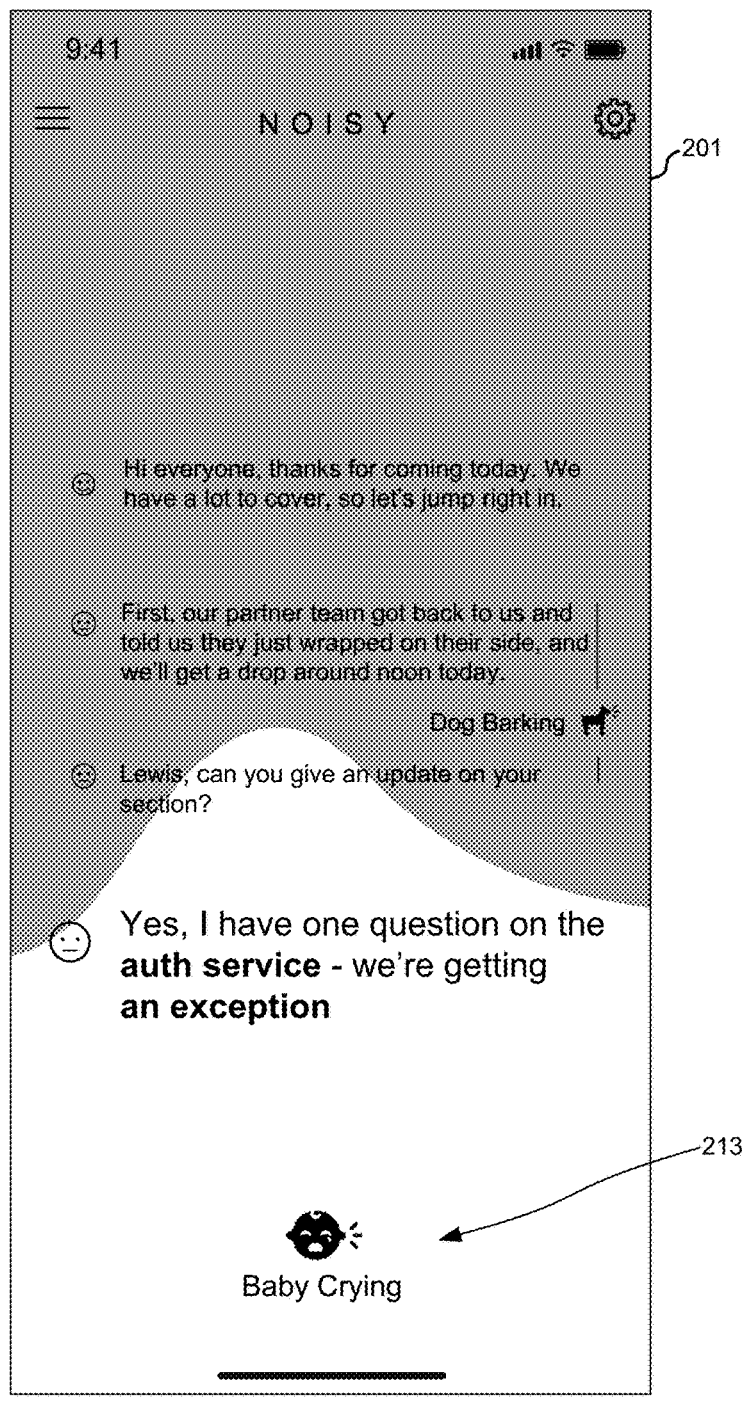
FIG. 7 is an example user interface and a model configuration for a scenario where one stream of a communication system includes background noise, such as a crying baby.
Figure 7:
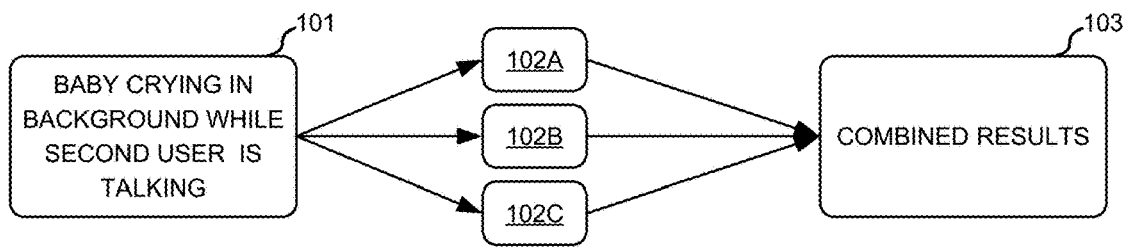

With reference to the example of FIGS. 6 and 7, consider a scenario where the audio data 101 includes a speech input from a second user and that speech input is interrupted with background sounds. As shown in FIG. 6, when the person starts to talk, the arrangement attributes indicate that the sentiment is the same as the sentiment shown in FIG. 5, e.g., a quiet sentiment. The sentiment recognition model and the speech recognition model process the speaker's voice in a way that is consistent with the above-described example shown in FIG. 5. Thus, the sentiment recognition model can cause the display of the light colored background and a layout conveying the same sentiment.

As shown in FIG. 7, when one of the audio streams of the communication session includes background noise, such as a crying baby, the audio recognition model 102C recognizes this sound as a non-speech event. In this example, the background noise can be analyzed using different criteria to determine an event category and appropriate label for the non-speech event. In one illustrative example, the audio recognition model can access a number of different sound categories that are each associated with sound templates that define characteristics of different types of non-speech sounds. The audio recognition model can compare the non-speech event with the sound templates. If a sound template has a threshold match with the captured sound, the system can use the template to identify an appropriate text description and corresponding graphical representation of the event. As shown, in response to determining a match with a given sound template of a crying baby, the system can display the graphical representation 213 of the of event type. As shown, this example of the graphical representation 213 indicates that a crying baby has been detected. The audio recognition model can also change other arrangement attributes such as the background color and other text messages indicating the changed environment, e.g., changing a status from "quiet" to "noisy."

These tasks performed by the audio recognition model 102C can be processed in parallel with the tasks performed by the sentiment recognition model 102A and the speech recognition model 102B. In this example, while the audio recognition model 102C is processing the non-speech input, a person's voice is transcribed by the speech recognition model. In addition, keywords are identified by the speech recognition model, which causes the display of the bolded keywords.

Figure 8:
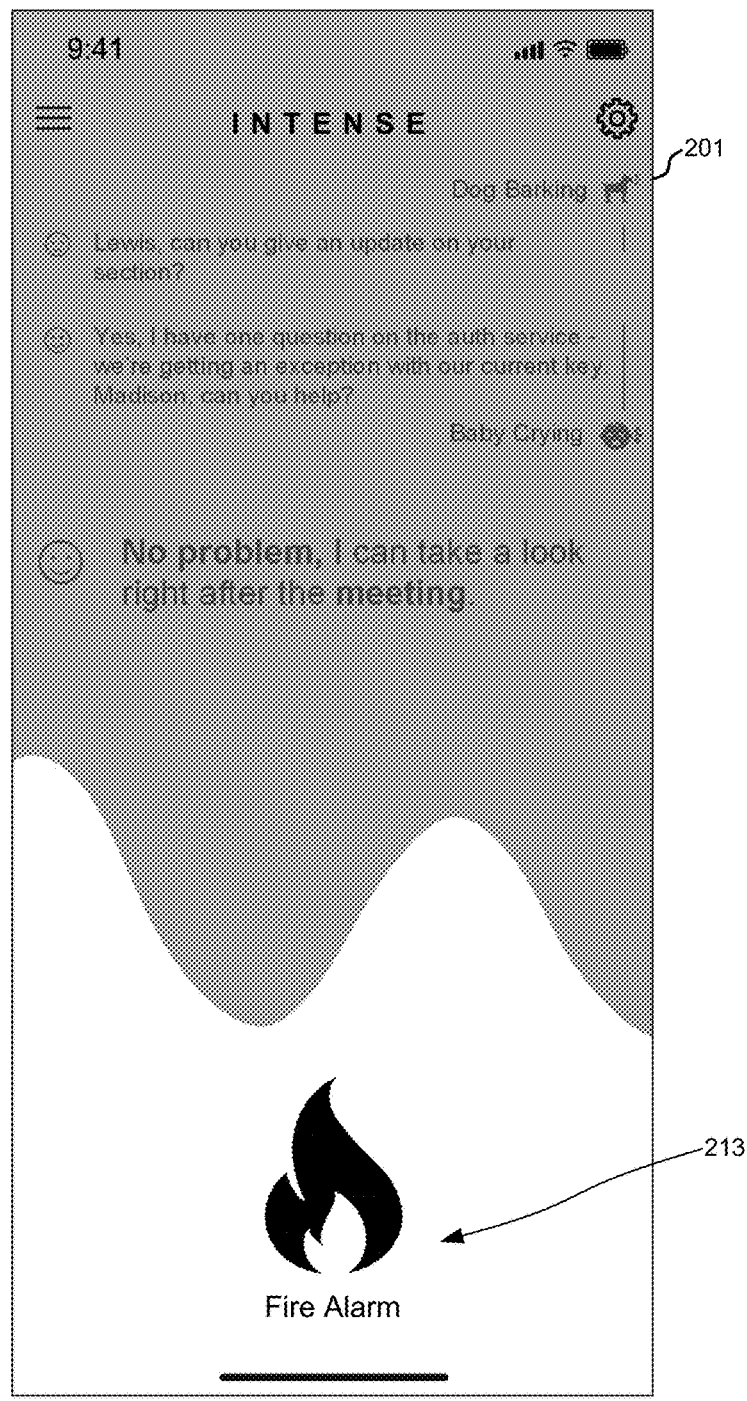
FIG. 8 is an example user interface and a model configuration for a scenario where one stream of a communication system includes background noise, such as a fire alarm.
Figure 8:
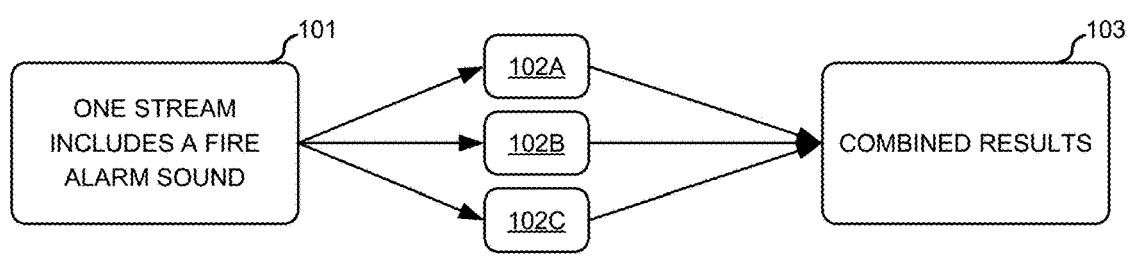

With reference to FIG. 8, consider a scenario where the audio data 101 includes another type of background noise, such as a fire alarm. In this scenario, the audio recognition model 102C can detect and analyze the non-speech input and determine that the non-speech input is associated with another type of non-speech event. The system can display the graphical representation 213 of the of new event type, which in this case indicates that an alarm has been detected. The audio recognition model can also change other arrangement attributes such as the background color and other text messages indicating the changed environment, e.g., changing a status from "noisy" to "intense." These tasks performed by the audio recognition model 102C are processed in parallel with the tasks performed by the sentiment recognition model 102A and the speech recognition model 102B for processing the speech. In this example, a person's voice is transcribed by the speech recognition model. In addition, keywords are identified by the speech recognition model and highlighted in bold text.

Figure 9:
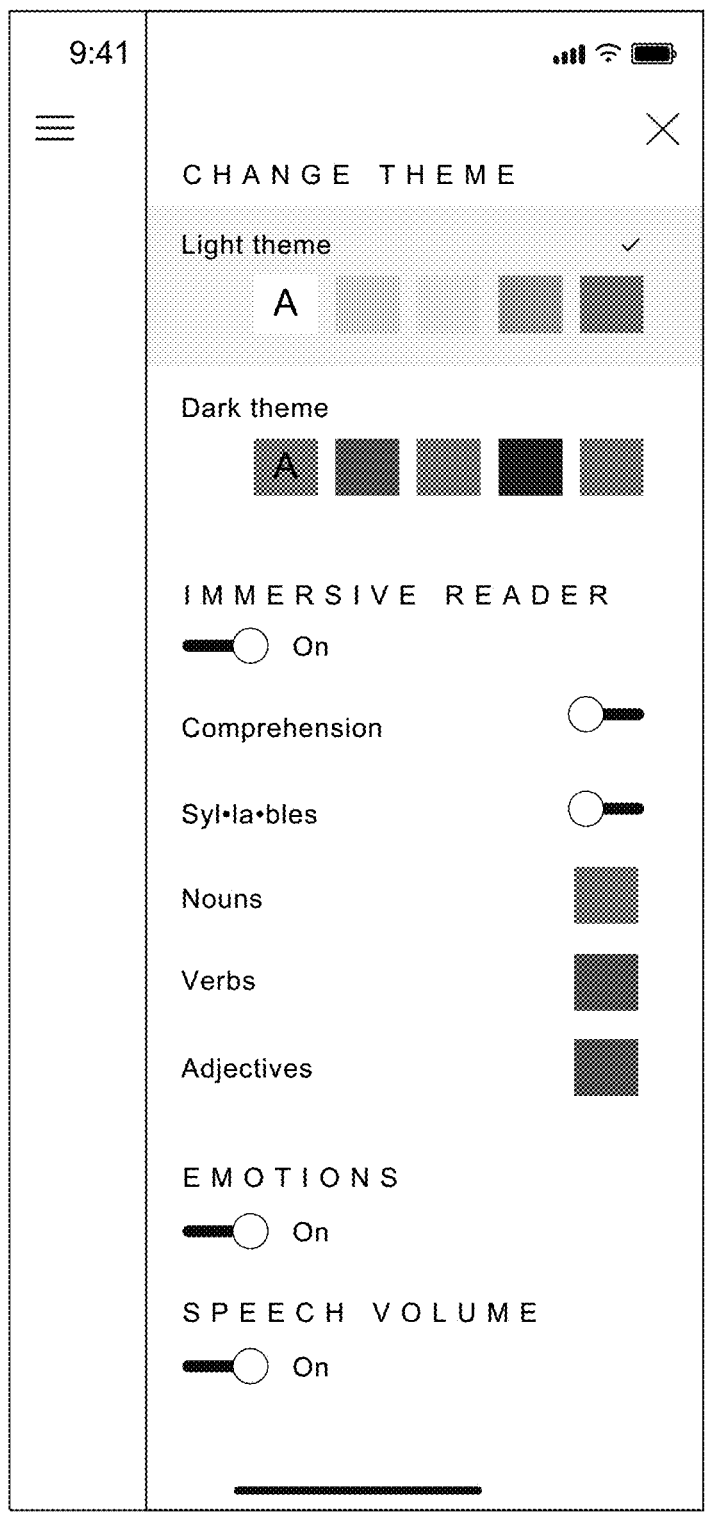
FIG. 9 is an example user interface that allows users to control and configure the functionality of the AI models.

FIG. 9 illustrates an example user interface that can be utilized to configure the models. In a first user interface element, the system can allow the user to select color lighting themes. User element can also be provided to turn on an immersive mode. This can allow a user to control how much text is generated from the meeting. For example, when the immersive mode is turned off, the system may only transcribed salient portions of the conversation. Other menu items can allow users to control highlighting, e.g., where nouns or verbs are highlighted or not highlighted. In addition, other display attributes described herein can be optionally disabled, which can include toggling the display of the emotion icons. In yet another control, the system can allow a user to control the effects of the speech volume. For instance, when the speech volume feature is turned on, the system may determine a sentiment and display corresponding graphical elements based on volume levels detected in conversations. When the speech volume feature is turned off, the system may not change a sentiment based on a volume level. Instead, the system may determine a sentiment based on other voice characteristics.

Figure 10:
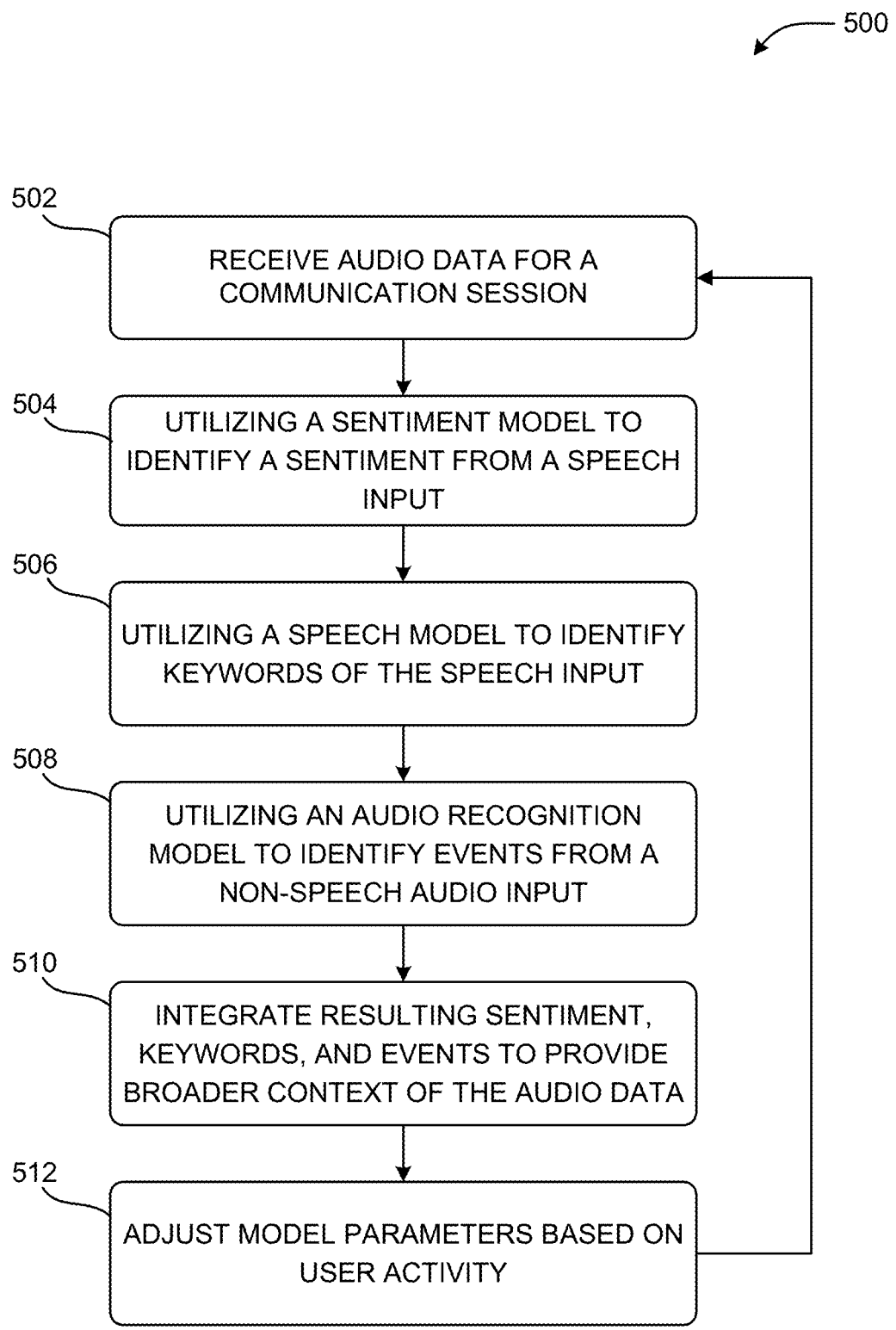
FIG. 10 is a flow diagram showing aspects of a routine for providing intelligent display of auditory world experiences.

FIG. 10 is a diagram illustrating aspects of a routine 500 for providing intelligent display of auditory world experiences. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 502 where the system 100 receives audio data 101 comprising individual audio streams from a plurality of computers participating in a communication session. The client computers of FIG. 11 include any type of device that can capture sound from a user using a microphone and generate a stream that includes audio data generated from the microphone.

At operation 504, the system 100 can utilize a sentiment recognition model to identify a sentiment from a speech input of a user. The speech input can be provided by at least one audio stream generated by at least one computer of the plurality of computers. The sentiment recognition model can be configured to identify the sentiment of the user in response to determining that a volume of the speech input meets one or more volume criteria.

At operation 506, the system 100 can utilize a speech recognition model to identify keywords of the speech input of the user, wherein the speech model is configured to identify keywords of the speech input by an analysis of the at least one audio stream generated by at least one computer, where the keywords are identified by the use of a keyword list that is configured based on user activity of the communication session. The speech model can be configured identify keywords of the speech input based on a keyword list. AI features allow the system to change the keyword list to improve the contextual accuracy.

At operation 508, the system 100 can utilize an audio recognition model 102C to identify one or more non-speech events based on the analysis of a non-speech audio input identified in the at least one audio stream generated by at least one computer of the plurality of computers. The audio recognition model can be configured to distinguish the speech input from the non-speech audio input and identify the one or more events based on audio characteristics of the non-speech audio input. The audio recognition model analyzes non-speech sounds to identify events, e.g., alarms, barking dogs, crying babies, etc.

In some embodiments, audio from microphones of each user is converted into features for audio understanding and for model input. Each model described herein can ingest an 80-bin log-mel filterbank (LMF) created from the raw input audio, which is a 2-dimensional spectrogram of frequency bins and time frames. Since the LMF is shared with all models, the output of each model can be synchronized and combined by ingesting identical time frames. Audio features also include raw signal analyses such as signal-to-noise ratio (SNR), transients, decibels relative to full scale (dBFS), fundamental and harmonic frequencies. These features contribute to sound understanding such as ambient, silent, alarming, noisy, loudness, etc. These features will further inform the conclusions and combined outputs to draw from the models described herein.

The system can also generate a confidence level with respect to each detected event. For example, the system can compare sound patterns of a background noise, such as a barking dog or a crying baby, and compare those patterns with known sound pattern templates. The comparison can generate a confidence level depending on how different sound features align, e.g., tone fluctuations, durations of certain components of the sounds, etc. The system can then determine that an event is detected if the confidence level exceeds a threshold. The system can also indicate that an event is not occurring when the confidence level does not exceed a threshold. In some embodiments, if an event is not detected or if a confidence level is below a threshold for a particular noise, the system may generate a notification reflecting such determinations. For instance, the system may provide the text output such as the "quiet" text notification shown in FIG. 6.

A confidence level can also be determined for a sentiment that is generated by a sentiment recognition model. For instance, when the sentiment recognition model identifies an audio input that contains the voices of several people, the system may provide a confidence level with respect to one of the speakers, such as a presenter of a meeting. If the confidence level is above a threshold, the system can utilize the volume of that speaker to generate data indicating a sentiment, e.g., a mood. However, if the confidence level is not above the threshold, the system can refrain from generating data indicating a sentiment.

At operation 510, the system can integrate the results from the models, including the resulting sentiment, keywords, and non-speech events to provide a broader context of the audio data. In some configurations, the system can generate a user interface 201 depicting the transcript 202 of spoken words of the users of the communication session. The system can determine arrangement attributes of the user interface 201 based on the sentiment that is determined from an analysis of the speech input of the user by the sentiment recognition model. The system can also display of the transcript in a format that visually distinguishes keywords that are identified by the speech recognition model. The visual distinction can be in the form of bolded text, highlighted text, or the modification of display properties that draw user focus to the keywords within the transcript. The user interface also includes visual indicators that are displayed in coordination with text of the transcript to indicate the non-speech events that are determined by the audio recognition model.

Next, at operation 512, the system can adjust model parameters based on user activity to improve the accuracy of each model. For instance, users who react to certain keywords can cause the speech recognition model to add keywords or remove keywords from a keyword list. Such feedback can be collected in a number of different ways. For instance, a system can utilize a camera to determine a gaze direction of the user and identify words that a user is looking at within the transcript. If a user has a threshold level of focus with respect to a certain word, and that word is not in the keyword list, the word that is within the users focus can be added to a keyword list.

The sentiment recognition model can also utilize user feedback to change one or more parameters. For instance, when users react verbally to a sentiment that is expressed in the user interface, the system may change the criteria for selecting sentiment categories. For instance, if a person states in a conversation that the system has a high number of false positive notifications of a particular sentiment, e.g., a red background indicating a high intensity sentiment, the system can adjust the criteria for identifying a particular sentiment. This can include raising a volume threshold for a speech input. Thus, a first time that the system is used, the system may have a first volume threshold. When a user speaks at a volume that exceeds the first volume threshold, the system may indicate a high intensity sentiment. If one or more users respond in a conversation indicating that the sentiment is incorrect, the sentiment recognition model may raise the volume threshold to reduce the number of false-positive notifications for that particular sentiment.

After operation 512, where one or more model parameters are adjusted, routine can return to operation 512 system continues the analysis of the audio data. In subsequent iterations of the routine 500, the system can dynamically utilize adjusted model parameters to more accurately modify arrangement attributes and display notifications to provide an intelligent display of auditory world experiences.

Figure 11:
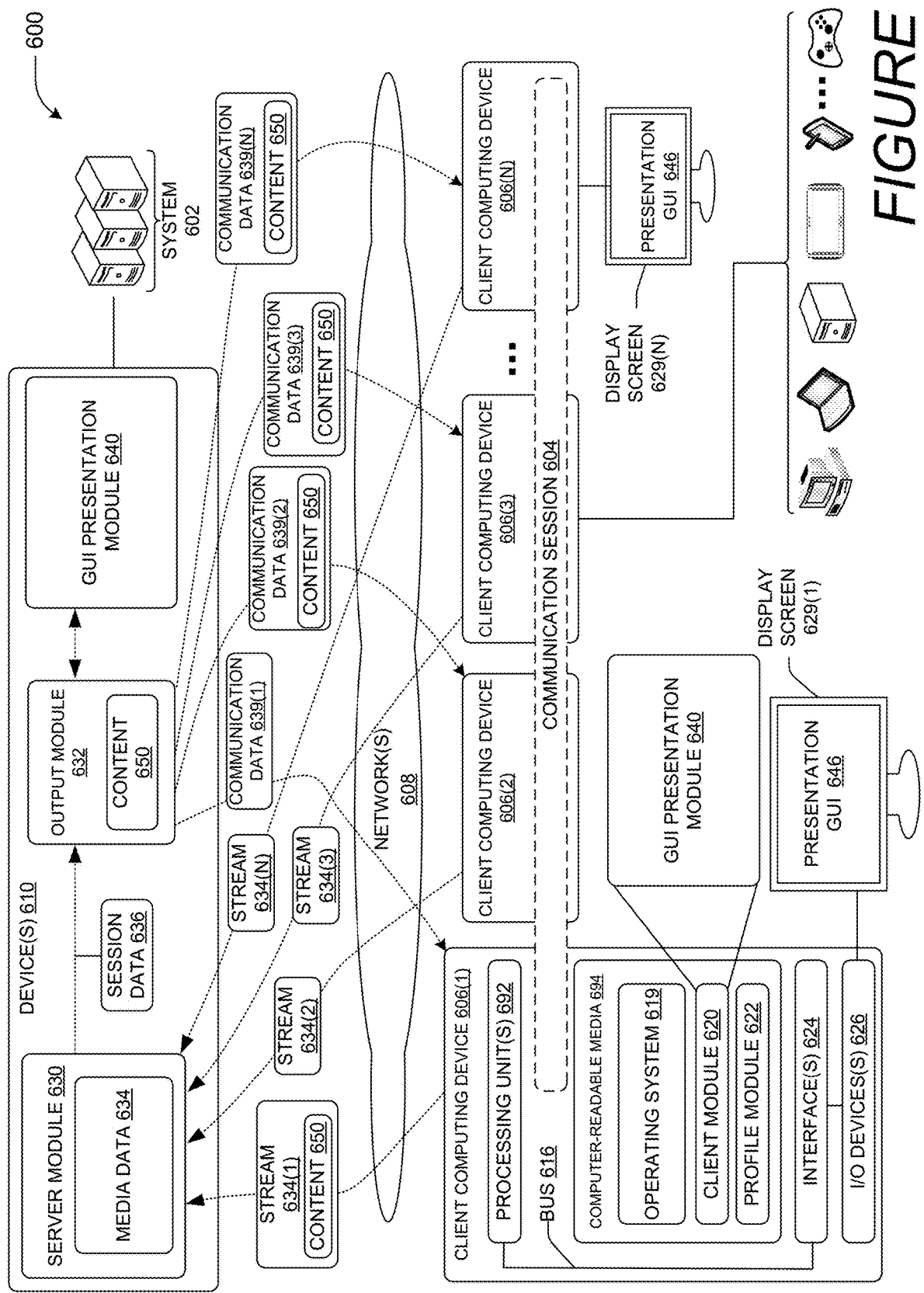
FIG. 11 is a computer architecture diagram illustrating an illustrative computer hardware and software architecture for a computing system capable of implementing aspects of the techniques and technologies presented herein.

FIG. 11 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 11 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 606(1) is in some way connected to a display device (e.g., a display screen 629(N)), which can display a UI according to the techniques described herein.

In the example environment 600 of FIG. 11, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 11) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter.

In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 12:
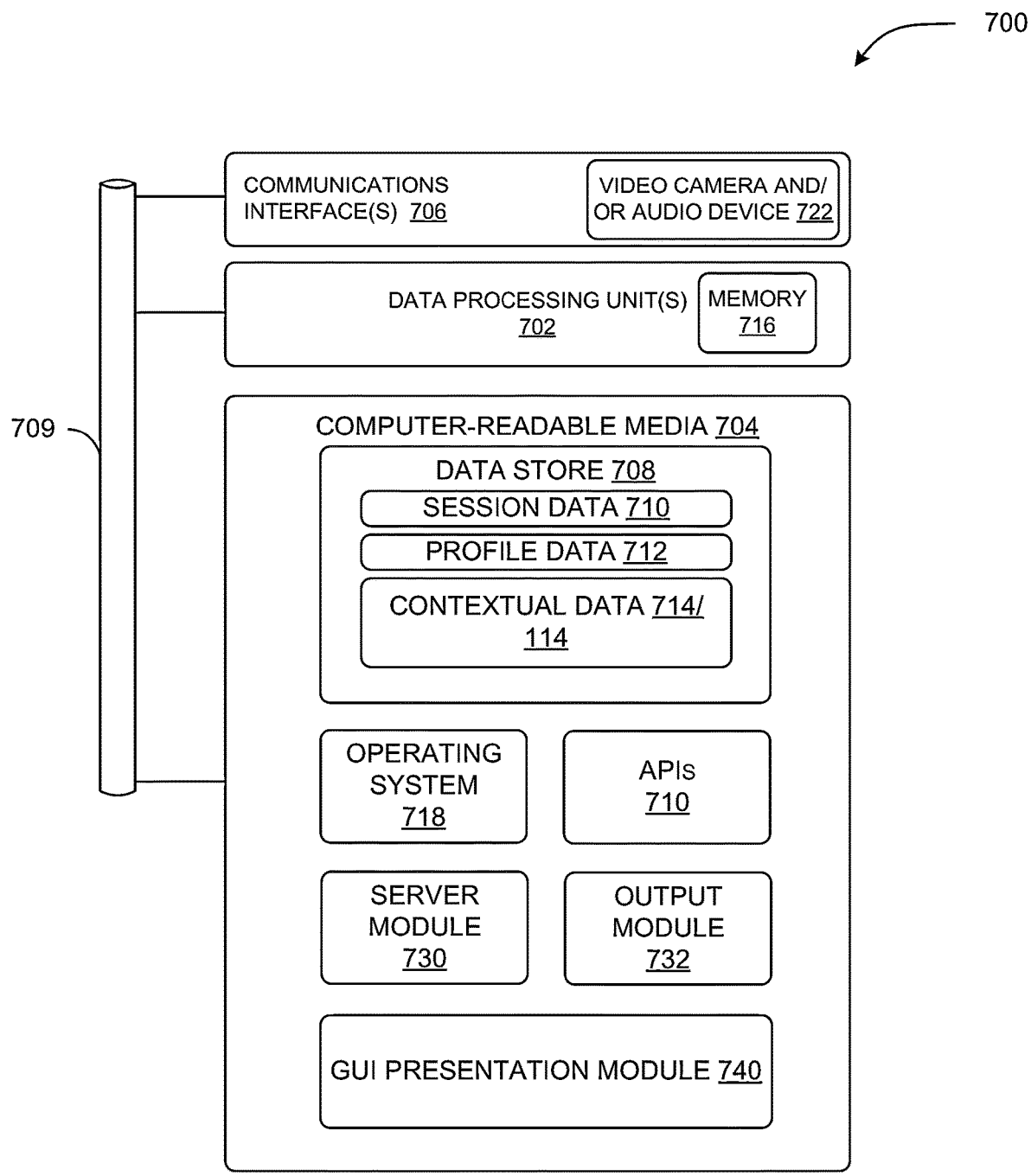
FIG. 12 is a computer architecture diagram illustrating a computing device architecture for a computing device capable of implementing aspects of the techniques and technologies presented herein.

FIG. 12 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 11), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method for execution on a system, the method comprising:
   receiving audio data comprising individual audio streams from a plurality of computers participating in a communication session;
   utilizing a sentiment recognition model to identify a sentiment from a speech input of a user, wherein the speech input is provided by at least one audio stream generated by at least one computer of the plurality of computers, wherein the sentiment recognition model is configured to identify the sentiment of the user in response to determining that a volume of the speech input meets one or more volume criteria;
   utilizing a speech recognition model to generate a transcript of spoken words that are identified in the audio data that is received from the plurality of computers, wherein the speech recognition model is also configured to identify keywords of the speech input of the user, wherein the speech recognition model is configured to identify keywords of the speech input by an analysis of the at least one audio stream generated by at least one computer, where the keywords are identified by the use of a keyword list that is based, at least in part, on user activity of the communication session, wherein the speech recognition model is configured to modify the keyword list based on an input indicating focus on one or more words, wherein the one or more words identified in the input are added to the keyword list;
   utilizing an audio recognition model to identify one or more events based on the analysis of a non-speech audio input identified in the at least one audio stream generated by at least one computer of the plurality of computers, wherein the audio recognition model is configured to distinguish the speech input from the non-speech audio input and identify the one or more non-speech events based on audio characteristics of the non-speech audio input; and
   generating a user interface depicting the transcript of spoken words of the users of the communication session, wherein arrangement attributes of the user interface are selected based on the sentiment that is determined from an analysis of the speech input of the user by the sentiment recognition model, wherein the display of the transcript is arranged to distinguish keywords that are identified by the speech recognition model, and wherein the user interface comprises visual indicators that are displayed in coordination with text of the transcript to indicate the one or more non-speech events determined by the audio recognition model.

2. The computer-implemented of claim 1, wherein the volume of the speech input meets one or more volume criteria when the volume exceeds a volume threshold, wherein the sentiment is associated with data indicating an increased priority when the volume exceeds the volume threshold, wherein the arrangement attributes of the user interface are modified in to indicate the sentiment, wherein arrangement attributes includes at least one of a color, text content or an arrangement of user interface elements.

3. The computer-implemented of claim 1, wherein the sentiment recognition model is configured to modify the one or more volume criteria in response to the identification of a set of predetermined user inputs provided at the user interface.

4. The computer-implemented of claim 1, wherein the keywords are identified by comparing words of the transcript to individual words or phrases in the keyword list, wherein words of the transcript are identified as keywords when the words of the transcript have a threshold match with words or phrases in the keyword list, wherein the keywords are graphically distinguished in the user interface by a modification of a display property, wherein the display property includes at least one of a line thickness, a color, a font, or a transparency level.

5. The computer-implemented of claim 1, wherein a portion of the audio stream are analyzed to determine a sound pattern, the sound pattern causing a generation of a description to be displayed with the visual indicators.

6. The computer-implemented of claim 5, wherein the method further comprises: determining that the portion of the audio stream has a threshold match with a sound template; and
   selecting the visual indicators and the description that correspond to the sound template.

7. The computer-implemented method of claim 1, further comprising:
   determining that the user has a threshold level of focus on the one or more words; and
   adding the one or more words to the keyword list in response to determining that the user has the threshold level of focus on the one or more words.

8. The computer-implemented method of claim 1, further comprising:
   receiving the input from a camera directed toward the user for detecting an eye gaze of the user;
   determining that the user has a threshold level of focus on the one or more words based on the eye gaze of the user; and
   adding the one or more words to the keyword list in response to determining that the user has the threshold level of focus on the one or more words, wherein the one or more words are used to identify keywords of the speech input and coordinate portions of the transcript with the visual indicators.

9. The computer-implemented method of claim 1, further comprising: causing the speech recognition model to modify the keyword list based on the input indicating focus on the one or more words to be added to the keyword list, wherein the addition of the one or more words to the keyword list is for a display of the visual indicators of non-speech events to be displayed in association with the one or more words, wherein the one or more words identified in the input are added to the keyword list for use in generating additional transcripts of spoken words displayed with additional visual indicators associated with the one or more words, wherein the one or more words are used to identify keywords of the speech input and coordinate portions of the transcript with the visual indicators.

10. A computing device, comprising:
one or more processing units; and
a computer-readable storage medium having encoded thereon computer-executable instructions to cause the one or more processing units to perform a method comprising:
receiving audio data comprising individual audio streams from a plurality of computers participating in a communication session;
utilizing a sentiment recognition model to identify a sentiment from a speech input of a user, wherein the speech input is provided by at least one audio stream generated by at least one computer of the plurality of computers, wherein the sentiment recognition model is configured to identify the sentiment of the user in response to determining that a volume of the speech input meets one or more volume criteria;
utilizing a speech recognition model to generate a transcript of spoken words that are identified in the audio data that is received from the plurality of computers, wherein the speech recognition model is also configured to identify keywords of the speech input of the user, wherein the speech recognition model is configured to identify keywords of the speech input by an analysis of the at least one audio stream generated by at least one computer, where the keywords are identified by the use of a keyword list that is based, at least in part, on user activity of the communication session, wherein the speech recognition model is configured to modify the keyword list based on an input indicating focus on one or more words, wherein the one or more words identified in the input are added to the keyword list;
utilizing an audio recognition model to identify one or more events based on the analysis of a non-speech audio input identified in the at least one audio stream generated by at least one computer of the plurality of computers, wherein the audio recognition model is configured to distinguish the speech input from the non-speech audio input and identify the one or more non-speech events based on audio characteristics of the non-speech audio input; and
generating a user interface depicting the transcript of spoken words of the users of the communication session, wherein arrangement attributes of the user interface are selected based on the sentiment that is determined from an analysis of the speech input of the user by the sentiment recognition model, wherein the display of the transcript is arranged to distinguish keywords that are identified by the speech recognition model, and wherein the user interface comprises visual indicators that are displayed in coordination with text of the transcript to indicate the non-speech events determined by the audio recognition model.

11. The computing device of claim 10, wherein the volume of the speech input meets one or more volume criteria when the volume exceeds a volume threshold, wherein the sentiment is associated with data indicating an increased priority when the volume exceeds the volume threshold, wherein the arrangement attributes of the user interface are modified in to indicate the sentiment, wherein arrangement attributes includes at least one of a color, text content or an arrangement of user interface elements.

12. The computing device of claim 10, wherein the sentiment recognition model is configured to modify the one or more volume criteria in response to the identification of a set of predetermined user inputs provided at the user interface.

13. The computing device of claim 10, wherein the keywords are identified by comparing words of the transcript to individual words or phrases in the keyword list, wherein words of the transcript are identified as keywords when the words of the transcript have a threshold match with words or phrases in the keyword list, wherein the keywords are graphically distinguished in the user interface by a modification of a display property, wherein the display property includes at least one of a line thickness, a color, a font, or a transparency level.

14. The computing device of claim 10, wherein a portion of the audio stream are analyzed to determine a sound pattern, the sound pattern causing a generation of a description to be displayed with the visual indicators.

15. The computing device of claim 14, wherein the method further comprises:
determining that the portion of the audio stream has a threshold match with a sound template; and
selecting the visual indicators and the description that correspond to the sound template.

16. A computer-readable storage medium having encoded thereon computer-executable instructions to cause one or more processing units of a system to perform a method comprising:
receiving audio data comprising individual audio streams from a plurality of computers participating in a communication session;
utilizing a sentiment recognition model to identify a sentiment from a speech input of a user, wherein the speech input is provided by at least one audio stream generated by at least one computer of the plurality of computers, wherein the sentiment recognition model is configured to identify the sentiment of the user in response to determining that a volume of the speech input meets one or more volume criteria;
utilizing a speech recognition model to generate a transcript of spoken words that are identified in the audio data that is received from the plurality of computers, wherein the speech recognition model is also configured to identify keywords of the speech input of the user, wherein the speech recognition model is configured to identify keywords of the speech input by an analysis of the at least one audio stream generated by at least one computer, where the keywords are identified by the use of a keyword list that is based, at least in part, on user activity of the communication session, wherein the speech recognition model is configured to modify the keyword list based on an input indicating focus on one or more words, wherein the one or more words identified in the input are added to the keyword list;

utilizing an audio recognition model to identify one or more events based on the analysis of a non-speech audio input identified in the at least one audio stream generated by at least one computer of the plurality of computers, wherein the audio recognition model is configured to distinguish the speech input from the non-speech audio input and identify the one or more events based on audio characteristics of the non-speech audio input; and generating a user interface depicting the transcript of spoken words of the users of the communication session, wherein arrangement attributes of the user interface are selected based on the sentiment that is determined from an analysis of the speech input of the user by the sentiment recognition model, wherein the display of the transcript is arranged to distinguish keywords that are identified by the speech recognition model, and wherein the user interface comprises visual indicators that are displayed in coordination with text of the transcript to indicate the events determined by the audio recognition model.

17. The computer-readable storage medium of claim 16, wherein the volume of the speech input meets one or more volume criteria when the volume exceeds a volume threshold, wherein the sentiment is associated with data indicating an increased priority when the volume exceeds the volume threshold, wherein the arrangement attributes of the user interface are modified in to indicate the sentiment, wherein arrangement attributes includes at least one of a color, text content or an arrangement of user interface elements.

18. The computer-readable storage medium of claim 16, wherein the sentiment recognition model is configured to modify the one or more volume criteria in response to the identification of a set of predetermined user inputs provided at the user interface.

19. The computer-readable storage medium of claim 16, wherein the keywords are identified by comparing words of the transcript to individual words or phrases in the keyword list, wherein words of the transcript are identified as keywords when the words of the transcript have a threshold match with words or phrases in the keyword list, wherein the keywords are graphically distinguished in the user interface by a modification of a display property, wherein the display property includes at least one of a line thickness, a color, a font, or a transparency level.

20. The computer-readable storage medium of claim 16, wherein a portion of the audio stream are analyzed to determine a sound pattern, the sound pattern causing a generation of a description to be displayed with the visual indicators.

* * * * *